(12) United States Patent
Bolthouse et al.

(10) Patent No.: US 11,597,374 B2
(45) Date of Patent: Mar. 7, 2023

(54) METHODS AND SYSTEM FOR ARBITRATING FUEL CUT OUT FOR A HYBRID VEHICLE

(71) Applicant: Ford Global Technologies, LLC, Dearborn, MI (US)

(72) Inventors: Alec Bolthouse, Dearborn, MI (US); Andrew Burt, Royal Oak, MI (US); Justin Panhans, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 17/016,766

(22) Filed: Sep. 10, 2020

(65) Prior Publication Data
US 2022/0073050 A1 Mar. 10, 2022

(51) Int. Cl.
| | |
|---|---|
| *B60W 20/15* | (2016.01) |
| *B60W 10/06* | (2006.01) |
| *B60W 10/08* | (2006.01) |
| *B60W 10/02* | (2006.01) |
| *F02D 41/30* | (2006.01) |
| *F02D 13/06* | (2006.01) |
| *B60W 40/105* | (2012.01) |
| *B60W 20/20* | (2016.01) |
| *F02D 13/04* | (2006.01) |

(52) U.S. Cl.
CPC ............ *B60W 20/15* (2016.01); *B60W 10/02* (2013.01); *B60W 10/06* (2013.01); *B60W 10/08* (2013.01); *B60W 20/20* (2013.01); *B60W 40/105* (2013.01); *F02D 13/06* (2013.01); *F02D 41/3005* (2013.01); *B60W 2510/0638* (2013.01); *B60W 2510/244* (2013.01); *B60W 2520/00* (2013.01); *F02D 13/04* (2013.01); *F02D 2200/101* (2013.01); *F02D 2200/501* (2013.01)

(58) Field of Classification Search
CPC ...... B60W 20/15; B60W 10/02; B60W 10/06; B60W 10/08; B60W 40/105; B60W 2510/0638; B60W 2510/244; B60W 2520/00; B60W 20/16; B60W 20/40; B60W 20/13; B60W 20/10; F02D 13/06; F02D 41/3005; F02D 13/04; F02D 2200/101; F02D 2200/501; F02D 2041/002; F02D 41/042; F02D 41/123; F02D 2250/21; F02D 17/02; F02N 11/0814; Y02T 10/12; Y02T 10/62
USPC .......................................... 701/22; 180/65.28
See application file for complete search history.

(56) References Cited

U.S. PATENT DOCUMENTS

| | | | |
|---|---|---|---|
| 6,988,572 B2 * | 1/2006 | Tatara ................. | B60W 20/00 180/65.26 |
| 7,540,344 B2 * | 6/2009 | Yamamoto ............ | B60W 50/08 180/65.285 |
| 7,748,483 B2 * | 7/2010 | Usoro .................. | B60W 10/30 180/65.28 |
| 9,061,684 B2 | 6/2015 | Yoshikawa et al. | |

(Continued)

*Primary Examiner* — Sizo B Vilakazi
*Assistant Examiner* — Brian R Kirby
(74) *Attorney, Agent, or Firm* — David Kelley; McCoy Russell LLP

(57) ABSTRACT

A method and system for operating a hybrid vehicle that includes an integrated starter/generator and a driveline disconnect clutch is described. In one example, the method determines whether or not to rotate an engine via an electric machine while propelling a vehicle via the electric machine according to vehicle efficiency.

20 Claims, 4 Drawing Sheets

(56) References Cited

U.S. PATENT DOCUMENTS

| | | | |
|---|---|---|---|
| 9,598,084 B2 | 3/2017 | Kuroki et al. | |
| 10,215,118 B2* | 2/2019 | Ohmura | B60W 10/06 |
| 2003/0160455 A1* | 8/2003 | Hu | B60W 10/06 |
| | | | 290/40 C |
| 2007/0068494 A1* | 3/2007 | Price | F02D 17/02 |
| | | | 123/481 |
| 2008/0071437 A1* | 3/2008 | Hirata | B60W 10/08 |
| | | | 701/22 |
| 2010/0087288 A1* | 4/2010 | Yamamoto | F02D 29/02 |
| | | | 180/65.265 |
| 2010/0174460 A1* | 7/2010 | Gibson | B60W 10/026 |
| | | | 701/112 |
| 2010/0312422 A1* | 12/2010 | Imaseki | B60W 10/06 |
| | | | 180/65.265 |
| 2011/0021312 A1* | 1/2011 | Fukitani | F02D 41/0215 |
| | | | 180/65.265 |
| 2013/0053214 A1* | 2/2013 | Kawai | B60K 6/547 |
| | | | 903/902 |
| 2013/0096761 A1* | 4/2013 | Kuroda | B60L 50/16 |
| | | | 180/65.265 |
| 2013/0296104 A1* | 11/2013 | Nefcy | B60W 10/026 |
| | | | 903/902 |
| 2013/0297121 A1* | 11/2013 | Reed | B60W 30/20 |
| | | | 180/65.265 |
| 2014/0162838 A1* | 6/2014 | Doering | B60K 6/38 |
| | | | 180/65.265 |
| 2014/0288807 A1* | 9/2014 | Tribulowski | F16H 61/143 |
| | | | 701/112 |
| 2016/0046276 A1* | 2/2016 | Martin et al. | B60W 10/06 |
| 2016/0176395 A1* | 6/2016 | Hata | B60K 6/20 |
| | | | 180/65.265 |
| 2016/0176396 A1* | 6/2016 | Hata | B60W 20/40 |
| | | | 180/65.265 |
| 2016/0251010 A1* | 9/2016 | Hata | B60W 20/16 |
| | | | 701/22 |
| 2016/0375892 A1* | 12/2016 | Kim | B60W 10/08 |
| | | | 701/22 |
| 2017/0113679 A1* | 4/2017 | Hata | B60W 10/02 |
| 2017/0120924 A1* | 5/2017 | Oshiumi | B60K 6/445 |
| 2019/0032590 A1* | 1/2019 | Conis | F02M 26/54 |
| 2020/0094833 A1* | 3/2020 | Hamperl | B60W 10/02 |

* cited by examiner

METHODS AND SYSTEM FOR ARBITRATING FUEL CUT OUT FOR A HYBRID VEHICLE

FIELD

The present description relates to methods and a system for judging whether or not it may be desirable to shut off or cut off fuel delivery to cylinders of an engine. The methods and systems may be suitable for hybrid vehicles.

BACKGROUND AND SUMMARY

At low driver demand loads, an engine may be operated in a high efficiency engine operating region by loading the engine via an electric machine. However, if a battery state of charge (SOC) is high, then there may be no place to store electric energy that is generated via the electric machine. Consequently, during some operating conditions, the electric machine may not be able to load the engine to increase engine operating efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to improving efficiency of a hybrid vehicle. The hybrid vehicle may include an internal combustion engine of the type shown in FIG. 1. The engine may be included in a driveline as shown in FIG. 2. The driveline may allow the engine to stop rotating while the vehicle is moving and the driveline may allow the engine to rotate while the engine is not receiving fuel so that driveline efficiency may be improved. The driveline may be operated according to the sequence of FIG. 3 and the method of FIG. 4.

An internal combustion engine may operate less efficiently at lighter engine loads. In particular, engine pumping work may be relatively high at lower engine loads, thereby reducing engine efficiency. The engine's efficiency may be improved by increasing load on the engine and storing the engine's power that is not used to propel a vehicle within a battery for use at a later time. However, the battery has limited capacity to store power that is generated by the engine. Consequently, there may be times when continuing to operate the engine may be less efficient than may be desired. One way to preserve engine efficiency at low driver demand conditions may be to stop engine rotation, but driveline torque response may be diminished when rotation of an engine is stopped. Specifically, it may take several seconds to accelerate the engine back up to a speed of a driveline before engine torque may be made available to the driveline. In addition, it may not be desirable to repeatedly disconnect and reconnect the engine to the driveline.

The inventors herein have recognized the above issues and have provided a method for operating a driveline, comprising: ceasing to supply fuel to an engine while continuing to rotate the engine while a driver demand torque is positive in response to an electric machine having capacity to provide the driver demand torque and torque to rotate the engine.

By ceasing to supply fuel to an engine while continuing to rotate the engine while driver demand torque is positive in response to an electric machine having capacity to provide the driver demand torque and torque to rotate the engine, it may be possible to achieve the technical result of maintaining a responsive driveline while also conserving fuel. In particular, the engine may be quickly restarted by allowing fuel flow to the engine that is rotating at the speed of the electric machine in the driveline. Consequently, if driver demand increases, the engine does not have to be cranked and accelerated to driveline speed before engine torque is available to the driveline. Further, since fuel flow to the engine is stopped, fuel may be conserved.

The present description has several advantages. The present description may reduce fuel consumption while having the capacity to respond quickly to requests for torque increases. In addition, the approach may improve vehicle drivability.

Figure 1:
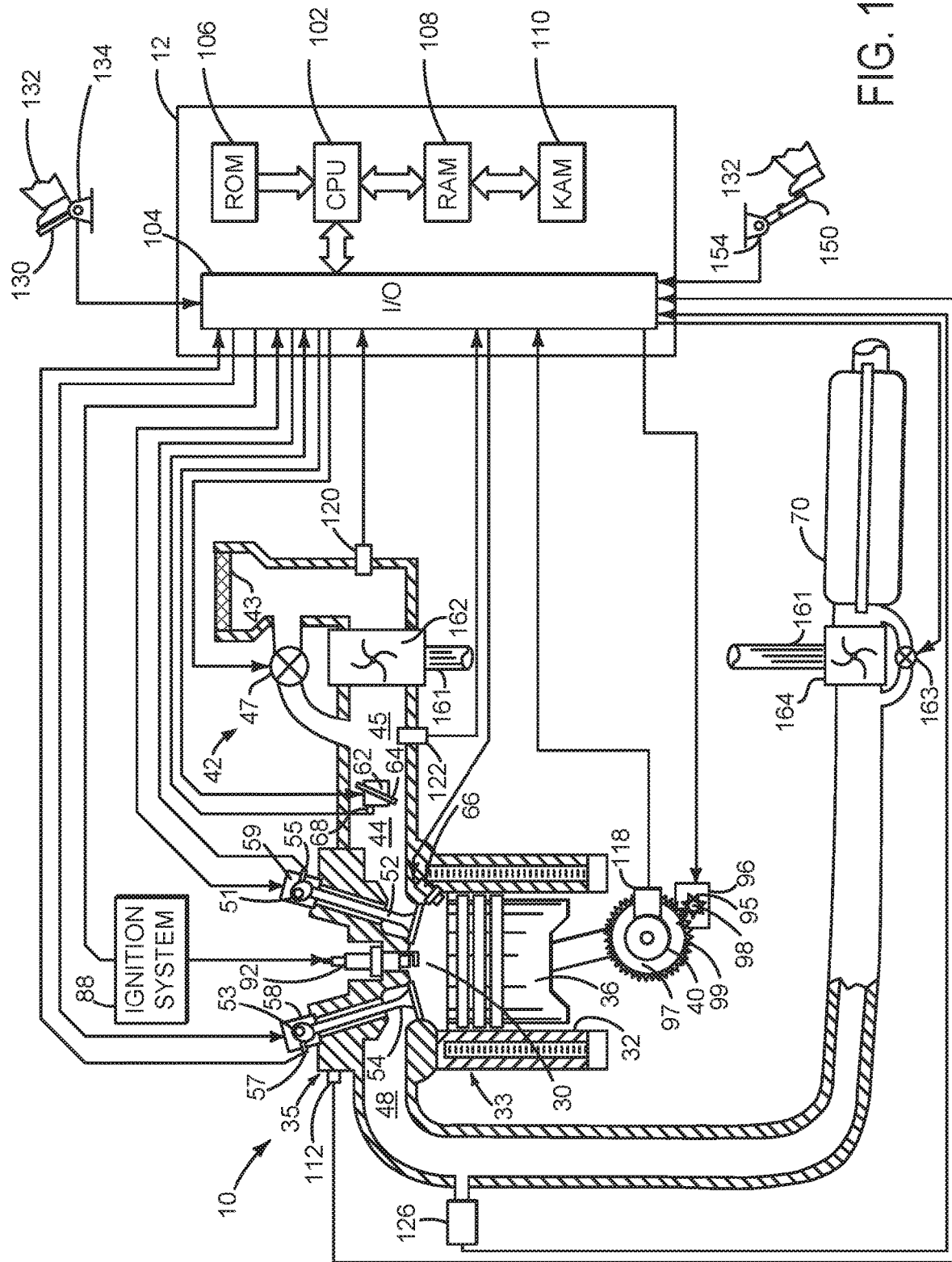
FIG. 1 shows a schematic diagram of an internal combustion engine.
Figure 2:
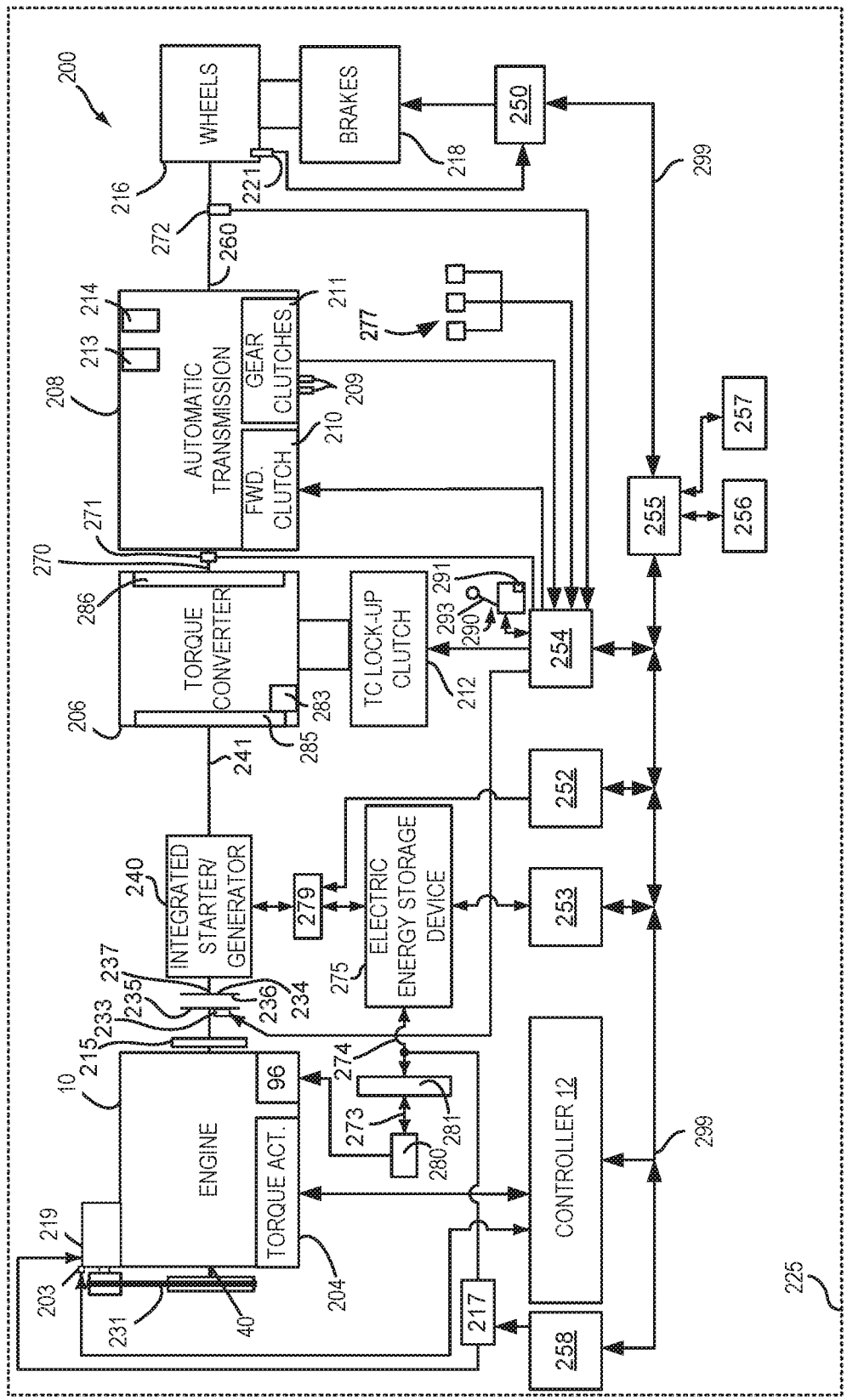
FIG. 2 shows a schematic diagram of an example vehicle driveline or powertrain including the internal combustion engine shown in FIG. 1.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. The lift amounts of the intake valve may be adjusted such that intake and/or exhaust valves remain open or closed over an entire engine cycle (e.g., two revolutions for a four stroke engine). Valve adjustment devices 58 and 59 may be electromechanical devices, hydraulic devices, or mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104 (e.g., including analog to digital converters, digital inputs, digital outputs, pulse width outputs, radio frequency inputs, radio frequency outputs, etc.), read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an propulsion pedal 130 for sensing force applied by human foot 132; a position sensor 154 coupled to brake pedal 150 for sensing force applied by foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, BISG controller 258, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, BISG controller 258, transmission controller 254, and brake controller 250 to achieve driver input requests and other requests that are based on vehicle operating conditions.

For example, in response to a driver releasing a propulsion pedal and vehicle speed, vehicle system controller 255 may request a desired wheel power or a wheel power level to provide a desired rate of vehicle speed change. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In response to an engine starting request, BISG controller 258 may rotate command BISG 219 to rotate and start engine 10. Likewise, electric machine controller 252 may rotate ISG 240 to rotate and start engine 10 while disconnect clutch 236 is closed to start engine 10. In addition, BISG controller 258 and electric machine controller 252 may output torque and speed of BISG 219 and ISG 240 to CAN 299 to be received by one or more of the other previously mentioned controllers during engine starting to provide feedback as to the operating states of these engine starting systems.

Vehicle controller 255 and/or engine controller 12 may also receive input from human/machine interface 256 and traffic and/or road conditions (e.g., traffic signal status, distance to objects, etc.) from sensors 257 (e.g., cameras, LIDAR, RADAR, global positioning receiver, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240 (e.g., ISG). In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via high voltage bus 274 via inverter 217. Inverter 217 converts direct current (DC) power from high voltage bus 274 to alternating current (AC) and vice-versa so that power may be exchanged between BISG 219 and electric energy storage device 275. Thus, BISG 219 may operate as a generator supplying electrical power to high voltage electric energy storage device (e.g., battery) 275 and/or low voltage bus 273. Bi-directional DC/DC converter 281 may transfer electrical energy from a high voltage bus 274 to a low voltage bus 273 or vice-versa. Low voltage battery 280 is electrically directly coupled to low voltage bus 273. Low voltage bus 273 may be comprised of one or more electrical conductors. Electric energy storage device 275 is electrically coupled to high voltage bus 274. Low voltage battery 280 may selectively supply electrical energy to starter motor 96.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be transferred to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information.

In response to a request to increase speed of vehicle 225, vehicle system controller may obtain a driver demand power or power request from an propulsion pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel torque limit of 50 N-m, ISG power is adjusted to provide less than 50 N-m (e.g., 49 N-m) of negative torque at the wheels, including compensating for transmission gearing.

The system of FIGS. 1 and 2 provides for a vehicle system, comprising: an internal combustion engine; an electric machine; and a controller including executable instructions stored in non-transitory memory that cause the controller to cut off fuel flow to the engine in response to a driver demand torque or power being less than a threshold torque or power below which driveline losses are lower than when the internal combustion engine is fueled. The vehicle system includes where the threshold torque or power is a function of vehicle speed and battery SOC. The vehicle system further comprises additional instructions to rotate the engine via the electric machine while fuel flow to the engine is cut off. The vehicle system further comprises additional instructions to hold open intake and exhaust valves for longer than an engine cycle while rotating the engine via the electric machine. The vehicle system further comprises additional instructions to fully close a throttle while rotating the engine via the electric machine. Alternatively, the vehicle system comprises additional instructions to fully open the throttle while rotating the engine via the electric machine to reduce pumping losses. The vehicle system further comprises additional instructions to reactivate fuel flow to the engine in response to an increase in driver demand torque or power. The vehicle system further comprising additional instructions to deliver the driver demand torque or power to vehicle wheels.

Figure 3:
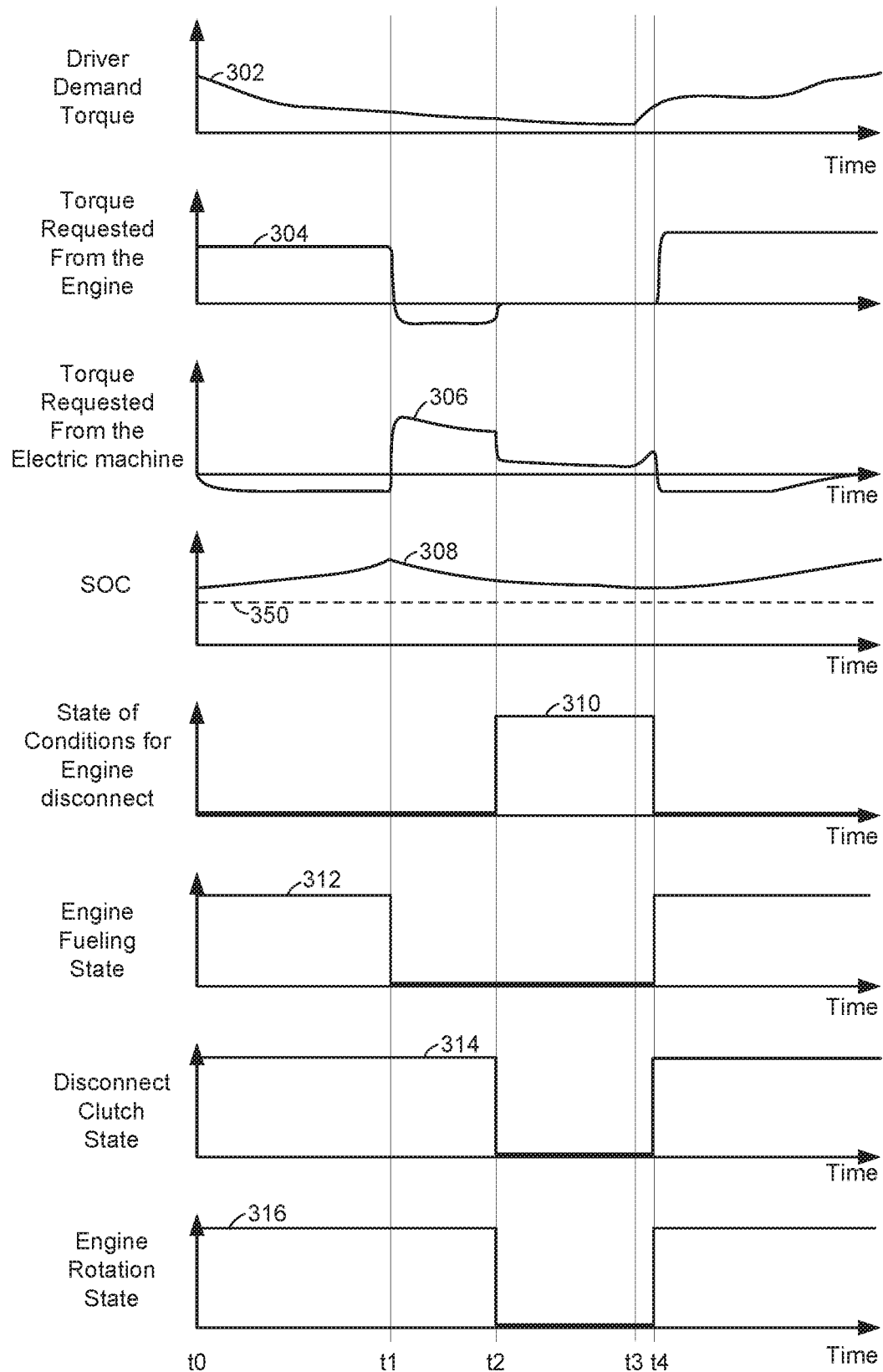
FIG. 3 shows example plots of an engine operating sequence.

Referring now to FIG. 3, an example vehicle operating sequence is shown. In particular, vehicle operation for low driver demand torque conditions is shown. The sequence of FIG. 3 may be generated via the system of FIGS. 1 and 2 in cooperation with the method of FIG. 4. Vertical lines at times t0-t5 represent times of interest during the sequence. The plots in FIG. 3 are time aligned and occur at the same time.

The first plot from the top of FIG. 3 is a plot of driver demand torque versus time. The vertical axis represents the driver demand torque and the driver demand torque increases in the direction of the vertical axis arrow. The horizontal axis represents time and the amount of time increases from the left side of the plot to the right side of the plot. Trace 302 represents the driver demand torque.

The second plot from the top of FIG. 3 is a plot of torque requested from the engine 10 versus time. The vertical axis represents the torque requested from the engine and the torque requested from the engine increases in the direction of the vertical axis arrow. The horizontal axis represents time and the amount of time increases from the left side of the plot to the right side of the plot. Trace 304 represents the torque requested from the electric machine.

The third plot from the top of FIG. 3 is a plot of torque requested from the electric machine (e.g., ISG 240) versus time. The torque requested from the electric machine may include the driver demand torque and torque to rotate the engine without fueling the engine. The vertical axis represents the torque requested from the electric machine and the torque requested from the electric machine increases in the direction of the vertical axis arrow. The horizontal axis represents time and the amount of time increases from the left side of the plot to the right side of the plot. Trace 306 represents the torque requested from the electric machine.

The fourth plot from the top of FIG. 3 is a plot of battery SOC versus time. The vertical axis represents the battery SOC and the battery SOC increases in the direction of the vertical axis arrow. The horizontal axis represents time and the amount of time increases from the left side of the plot to the right side of the plot. Trace 308 represents the battery SOC. Horizontal line 350 represents a threshold battery SOC. Fuel supplied to an engine may be cut off when the battery SOC is above threshold 350.

The fifth plot from the top of FIG. 3 is a plot of a state of conditions that indicate that the engine may be disconnected from the ISG versus time. The vertical axis represents the state of conditions that indicate that the engine may be disconnected from the ISG and the engine may be disconnected from the ISG when the state of conditions that indicates that the engine may be disconnected from the ISG is at a higher level near the vertical axis arrow. Conditions are not present to disconnect the engine from the ISG when the state of conditions that indicate that the engine may be disconnected from the ISG is at a lower level near the horizontal axis. Trace 310 represents the state of conditions that indicate that the engine may be disconnected from the ISG driveline temperature. The horizontal axis represents time and time increases from the left side of the plot to the right side of the plot.

The sixth plot from the top of FIG. 3 is a plot of engine fueling state versus time. The vertical axis represents the engine fueling state and the engine is supplied with fuel when the engine fueling state is at a higher level near the vertical axis arrow. The engine is not being supplied with fuel when the engine fueling state is at a lower level near the horizontal axis. Trace 312 represents the engine fueling state. The horizontal axis represents time and time increases from the left side of the plot to the right side of the plot.

The seventh plot from the top of FIG. 3 is a plot of driveline disconnect clutch state versus time. The vertical axis represents the driveline disconnect clutch state and the driveline disconnect clutch is closed such that the engine is connected to the ISG when the driveline disconnect clutch state is at a higher level near the vertical axis arrow. The driveline disconnect clutch is open so that the engine is not coupled to the ISG when the driveline disconnect clutch state is at a lower level near the horizontal axis. Trace 314 represents the driveline disconnect clutch state. The horizontal axis represents time and time increases from the left side of the plot to the right side of the plot.

The eighth plot from the top of FIG. 3 is a plot of engine rotation state versus time. The vertical axis represents the engine rotation state and the engine's crankshaft is rotating when the engine rotation state is at a higher level near the vertical axis arrow. The engine's crankshaft is not rotating (e.g., the engine is not rotating) when the engine rotation state is at a lower level near the horizontal axis. Trace 316 represents the engine rotation state. The horizontal axis represents time and time increases from the left side of the plot to the right side of the plot. At time t0, the engine is rotating and combusting fuel. The driver demand torque is being reduced and the engine is meeting the driver demand torque and increasing the SOC via the electric machine being in a generator mode. The engine is being fueled and the driveline disconnect clutch is closed.

Between t0 and t1, the engine continues rotating and combusting fuel. The driver demand torque continues to decline and the engine continues to meet the driver demand and charge the battery. The electric machine continues to operate at a negative torque in a generator mode and the SOC increases. Conditions to disconnect the engine from the ISG are not present. The engine is being fueled and the driveline disconnect clutch is closed.

At time t1, the driver demand has been reduced to a level where it is more efficient to cease supplying fuel to the engine and rotate the engine via the ISG than to continue fueling the engine. Therefore, fuel flow to the engine is ceased and the driveline disconnect clutch remains closed.

The torque requested from the engine moves to a negative value and the torque requested from the electric machine switches to a positive value (e.g., the electric machine operates as a motor). Conditions for disconnecting the engine from the ISG are not present and the engine continues to rotate. The SOC starts to be reduced.

At time t2, conditions for disconnecting the engine from the ISG are present and so the driveline disconnect clutch is opened to decouple the engine from the ISG. The torque requested from the electric machine declines because the ISG is not rotating the engine. The electric machine meets the driver demand torque and the engine torque is zero. The engine stops rotating the SOC continues to decrease. The driver demand torque continues to decrease. Fuel is not flowing to the engine.

After time t2 and before time t3, the engine is not rotating and the ISG is propelling the vehicle (not shown). The driver demand torque is low and the torque requested from the electric machine remains low. The battery SOC continues to decline and conditions remain for disconnecting the engine from the ISG. The driveline disconnect clutch remains open and the engine is not supplied with fuel.

At time t3, the driver demand torque begins to increase and the torque requested from the electric machine increases in response to the increase in driver demand torque. The SOC continues to decline and conditions for decoupling the engine from the ISG remain present. The engine is not fueled and the driveline disconnect clutch remains open. The engine is not rotating.

At time t4, the driver demand torque has increased sufficiently for the engine to be restarted. The driveline disconnect clutch is closed to begin rotating the engine and fuel is supplied to the engine. Conditions for disconnecting the engine from the ISG are no longer present. The battery SOC begins to increase shortly after time t4. The torque requested from the electric machine increases so that the engine may be rotated and started via the ISG. The engine starts and it begins to deliver torque to the driveline (not shown) shortly after time t4.

In this way, the engine may enter fuel cut off if conditions for disconnecting the engine from the ISG are not present. If conditions for disconnecting the engine from the ISG are present after fuel flow to the engine has ceased, engine rotation may be stopped to further reduce driveline power consumption by opening the driveline disconnect clutch.

Figure 4:
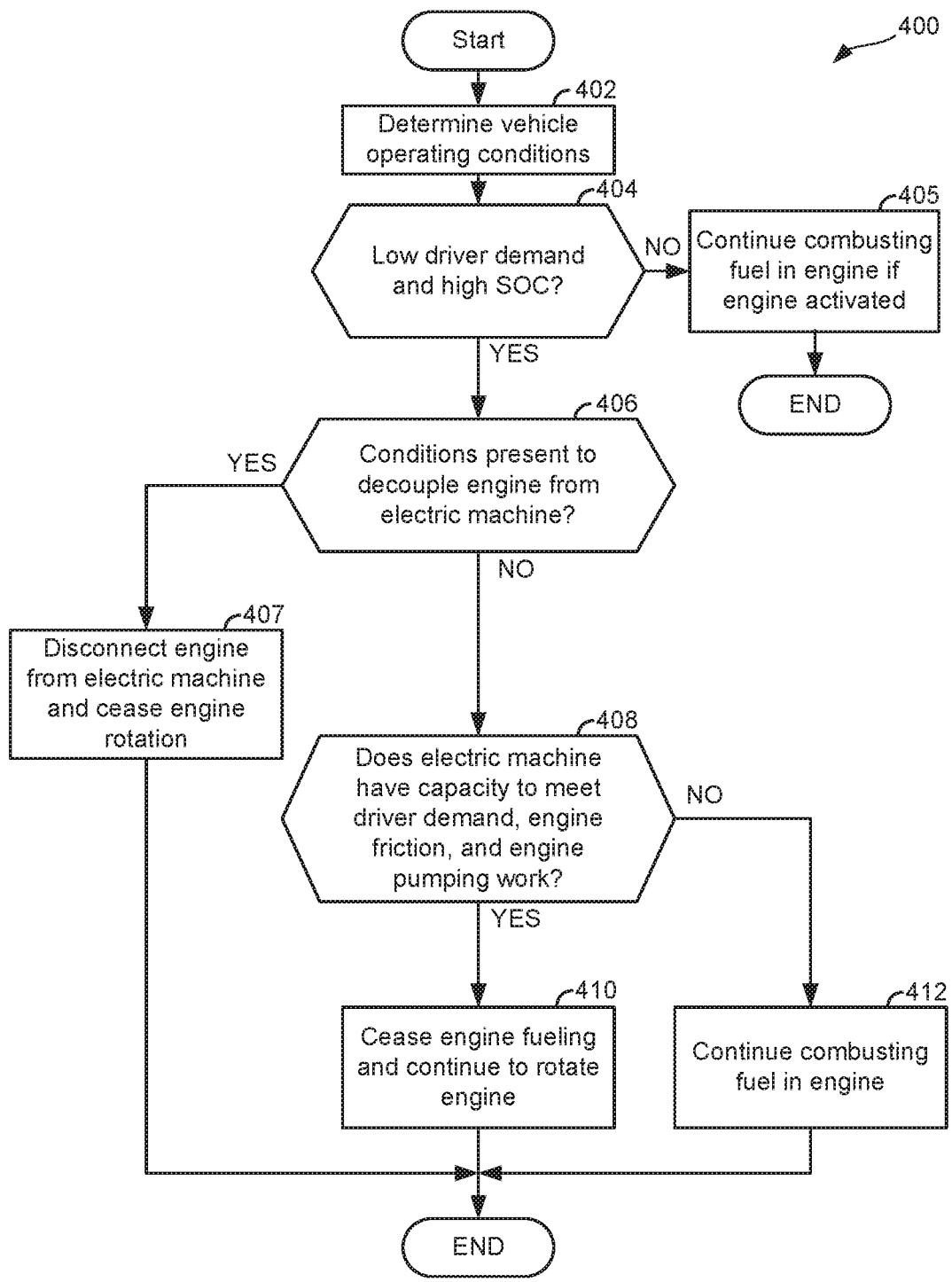
FIG. 4 shows a method for operating an engine of a hybrid vehicle.

Referring now to FIG. 4, an example method for operating a vehicle that includes an ISG and an engine is shown. The method of FIG. 4 may be incorporated into and may cooperate with the system of FIGS. 1 and 2. Further, at least portions of the method of FIG. 4 may be incorporated as executable instructions stored in non-transitory memory of a controller while other portions of the method may be performed via the controller transforming operating states of devices and actuators in the physical world.

At 402, method 400 determines vehicle operating conditions. Vehicle operating conditions may include but are not limited to vehicle speed, propulsion pedal position, brake pedal position, state of battery charge, transmission oil temperature, engine oil temperature, engine coolant temperature, and driver demand torque. Method 400 proceeds to 404.

At 404, method 400 judges if driver demand torque or power is low and battery SOC is high. In other words, method 400 may judge if driver demand torque or power is less than a first threshold and if battery state of charge is greater than a second threshold. The driver demand torque may be positive when the conditions are met. Method 400 may judge driver demand from propulsion pedal position and vehicle speed. In particular, vehicle speed and propulsion pedal position may reference or index a table of empirically determined driver demand torque or power values. The table outputs a driver demand torque or power value. Values may be determined via operating the vehicle on a dynamometer and adjusting driver demand values to provide a desired vehicle response according to a position of the propulsion pedal. If method 400 judges that driver demand is less than a first threshold and battery SOC is greater than a second threshold, the answer is yes and method 400 proceeds to 406. Otherwise, the answer is no and method 400 proceeds to 405.

At 405, method 400 continues to supply fuel to the engine and combust the fuel in the engine if the engine is activated. The engine may be restarted if the engine is stopped and if the driver demand is increased to be greater than the first threshold. The driveline disconnect clutch may be fully closed to start the engine and/or to allow the engine to transfer torque to the driveline. The engine may generate all or a portion of the driver demand torque or power that is delivered to the vehicle's wheels. Method 400 proceeds to exit.

At 406, method 400 judges if conditions are present to decouple the engine from the ISG via opening the driveline disconnect clutch. Conditions for decoupling the engine from the ISG may include engine speed being less than a threshold speed. In addition, other conditions for decoupling the engine from the ISG may also be required. For example, the engine may be decoupled from the ISG if ambient temperature is greater than a threshold temperature and if the driveline disconnect clutch actuating mechanism is not degraded. In another example, the method includes where the conditions are not present for disconnecting the engine from the electric machine include an expected increase in driver demand torque within a predetermined amount of time. For example, if it may be determined via a global positioning system that a vehicle is coasting downhill and the vehicle is expected to begin traveling uphill within one minute, it may be determined that conditions for disconnecting the engine from the electric machine are not present. If conditions are present to decouple the engine from the ISG, the answer is yes and method 400 proceeds to 407. Otherwise, the answer is no and method 400 proceeds to 408

At 407, method 400 fully opens the driveline disconnect clutch and decouples the engine from the ISG. In addition, method 400 ceases to supply fuel to the engine so that the engine's crankshaft ceases to rotate. Method 400 proceeds to exit.

At 408, method 400 judges if the electric machine has capacity to meet the driver demand torque or power. Method 400 also judges if the electric machine has capacity to overcome engine friction and engine pumping work so that the electric machine (e.g., ISG 240) may rotate the engine while the engine is not supplied with fuel. In one example, method 400 may determine a total torque or power capacity of the electric machine from a value that is stored in controller memory. The driver demand torque or power may be determined as previously described and the engine friction and pumping power or torque may be determined via indexing a table or function of torque or power amounts needed to rotate the engine via the electric machine according to engine speed and valve timings and/or valve operating states. The table or function may include values that are determined via rotating the engine at different speeds via a dynamometer and recording the torque and/or power needed to rotate the engine. The engine's valve timings and valve lift amounts may be adjusted while the engine is rotated via the dynamometer to determine valve timings and lifts that reduce engine pumping power.

If the electric machine's torque capacity or power capacity at the present speed of the driveline is greater than the driver demand torque or power plus the amount of torque to rotate the engine unfueled as determined from the lookup table, then the answer is yes and method 400 proceeds to 410. Otherwise, if the electric machine's torque capacity or power capacity at the present speed of the driveline is less than the driver demand torque or power plus the amount of torque to rotate the engine unfueled as determined from the lookup table, then the answer is no and method 400 proceeds to 412.

In some examples, method 400 may adjust a driver demand torque or power threshold for cutting off fuel to the engine and rotating the engine via the electric machine. For example, method 400 may cut off fuel flow to the engine and rotate the engine when driver demand torque is less than 60 Newton-meters for a given vehicle speed and battery state of charge. The driver demand torque below which fuel flow to the engine is ceased may be based on battery SOC, electric machine losses, and vehicle speed. The present battery SOC and vehicle speed may be used to index or reference a table or function that outputs empirically determined driver demand values. The driver demand values in the table or function may be determined via operating the vehicle on a dynamometer and recording driver demand values below which it is more efficient to meet the driver demand and rotate the engine via the electric machine (e.g., ISG 240) than it is to meet the driver demand via combusting fuel in the engine and provide the driver demand via the engine. If the driver demand is less than the driver demand threshold, the answer is yes and method 400 proceeds to 410. Otherwise, the answer is no and method 400 proceeds to 412.

Additionally, or alternatively, method 400 may determine if driver demand torque or power is less than a threshold torque or power below which driveline losses are lower than when the internal combustion engine is fueled. For example, if method 400 judges that driver demand torque or power is at a level where driveline losses are 250 watts due to engine thermal losses and other losses (e.g., engine pumping losses, engine friction losses, etc.) when an engine is fueled and engine losses are 200 watts due to engine losses (e.g., engine pumping losses and friction losses) when the engine is rotated via an electric machine without fuel flowing to the engine, the answer is yes and method 400 proceeds to 410. Otherwise, the answer is no and method 400 proceeds to 412. The driver demand threshold torque or power may be a function of vehicle speed and battery SOC.

At 410, method 400 ceases fuel flow to the engine and rotates the engine via the electric machine (e.g., ISG 240). Fuel flow to the engine may be ceased via commanding fuel injectors closed. The driveline disconnect clutch is closed and the electric machine also provides the requested driver demand to the vehicle's wheels to propel the vehicle via the electric machine. Method 400 may also adjust valve timing and lift to reduce engine pumping work. For example, intake and exhaust valves may be held open for longer than an engine cycle to reduce engine pumping work. In addition, an engine throttle may be fully closed to limit air flow to the engine's exhaust after treatment system. Alternatively, the engine throttle may be fully opened or at least partially opened to reduce engine pumping losses so that the ISG consumes less energy when rotating the engine. Method 400 proceeds to exit.

At 412, method 400 continues to combust fuel in the engine and the engine provides the requested driver demand to propel the vehicle. The driveline disconnect clutch is closed. The electric machine may rotate without charging the vehicle's battery. Method 400 proceeds to exit.

In this way, fuel flow to an internal combustion engine may be selectively activated and/or deactivated so that driveline efficiency may be improved. In addition, the engine may continue to rotate without fuel when it is determined to be efficient so that the engine may be reactivated quickly to meet increases in driver demand.

Thus, the method of FIG. 4 provides for a method for operating a driveline, comprising: ceasing to supply fuel to an engine while continuing to rotate the engine while a driver demand torque is positive in response to an electric machine having capacity to provide the driver demand torque and torque to rotate the engine. The method further comprises continuing to supply fuel to the engine in response to the electric machine lacking capacity to provide the driver demand torque and the torque to rotate the engine. The method includes where the ceasing to supply fuel to the engine occurs when conditions are not present for disconnecting the engine from the electric machine. The method includes where the conditions are not present for disconnecting the engine from the electric machine include a speed of the engine being greater than a threshold speed. The method includes where the conditions are not present for disconnecting the engine from the electric machine include an expected increase in driver demand torque within a predetermined amount of time. The method further comprises disconnecting the engine from the electric machine via a disconnect clutch when the conditions are present for disconnecting the engine from the electric machine. The method includes where ceasing to supply fuel to the engine includes deactivating fuel injectors.

Method 400 also provides for a method for operating a driveline, comprising: ceasing to supply fuel to an engine while continuing to rotate the engine while a driver demand torque is positive in response to rotating the engine without fuel being more efficient than rotating the engine while the engine is fueled. The method includes where the engine is rotated via an electric machine. The method further comprises maintaining a driveline disconnect clutch in a closed state in response to rotating the engine without fuel being more efficient than rotating the engine while the engine is fueled. The method further comprises opening a driveline clutch in response to conditions for disconnecting the engine from an electric machine being present. The method further comprises ceasing to supply fuel to the engine in further response to a battery state of charge being greater than a threshold. The method further comprises supplying fuel to the engine and closing the driveline disconnect clutch in response to an increase in driver demand torque or power.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline, comprising:
ceasing to supply fuel to an engine while continuing to rotate the engine while a driver demand torque is positive in response to an electric machine torque capacity being greater than a driver demand torque plus engine friction and pumping torque of an unfueled engine.

2. The method of claim 1, further comprising continuing to supply fuel to the engine in response to the electric machine lacking capacity to provide the driver demand torque and the torque to rotate the engine.

3. The method of claim 1, where the ceasing to supply fuel to the engine occurs when conditions are not present for disconnecting the engine from the electric machine.

4. The method of claim 3, where the conditions are not present for disconnecting the engine from the electric machine include a speed of the engine being greater than a threshold speed.

5. The method of claim 3, where the conditions are not present for disconnecting the engine from the electric machine include an expected increase in driver demand torque within a predetermined amount of time.

6. The method of claim 3, further comprising disconnecting the engine from the electric machine via a disconnect clutch when the conditions are present for disconnecting the engine from the electric machine, where the conditions include ambient air temperature being greater than a threshold and absence of driveline disconnect clutch degradation.

7. The method of claim 1, where ceasing to supply fuel to the engine includes deactivating fuel injectors.

8. A vehicle system, comprising:
an internal combustion engine;
an electric machine; and
a controller including executable instructions stored in non-transitory memory that cause the controller to cut off fuel flow to the internal combustion engine in response to an electric machine torque being greater than a driver demand torque plus engine friction and pumping torque of an unfueled engine.

9. The vehicle system of claim 8, where the controller cuts of fuel flow to the internal combustion engine in further response to a vehicle speed and a battery SOC.

10. The vehicle system of claim 8, further comprising additional instructions to rotate the internal combustion engine via the electric machine while fuel flow to the internal combustion engine is cut off.

11. The vehicle system of claim 10, further comprising additional instructions to hold open intake and exhaust valves for longer than an engine cycle while rotating the internal combustion engine via the electric machine.

12. The vehicle system of claim 11, further comprising additional instructions to fully close a throttle while rotating the internal combustion engine via the electric machine.

13. The vehicle system of claim 12, further comprising additional instructions to reactivate fuel flow to the internal combustion engine in response to an increase in driver demand torque or power.

14. The vehicle system of claim 8, further comprising additional instructions to deliver the driver demand torque or power to vehicle wheels.

15. A method for operating a driveline, comprising:
ceasing to supply fuel to an engine while continuing to rotate the engine while a driver demand torque is positive in response to an electric machine torque capacity as determined from controller memory being greater than a driver demand torque plus engine friction and pumping torque of an unfueled engine as determined from a lookup table.

16. The method of claim 15, where the engine is rotated via an electric machine.

17. The method of claim 16, further comprising maintaining a driveline disconnect clutch in a closed state in response to rotating the engine without fuel being more efficient than rotating the engine while the engine is fueled.

18. The method of claim 17, further comprising opening a driveline clutch in response to conditions for disconnecting the engine from the electric machine being present.

19. The method of claim 18, further comprising ceasing to supply fuel to the engine in further response to a battery state of charge being greater than a threshold.

20. The method of claim 19, further comprising supplying fuel to the engine and closing the driveline disconnect clutch in response to an increase in driver demand torque or power.

* * * * *